(12) United States Patent
Cserna et al.

(10) Patent No.: US 9,204,092 B2
(45) Date of Patent: Dec. 1, 2015

(54) INTERNET PROTOCOL VIDEO TELEPHONY WITH CARRIER GRADE VOICE

(71) Applicant: TELEFONAKTIEBOLAGET L M ERICSSON (PUBL), Stockholm (SE)

(72) Inventors: Bence Cserna, Budapest (HU); Attila Mihály, Dunakeszi (HU); Gábor Paller, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 78 days.

(21) Appl. No.: 14/143,480

(22) Filed: Dec. 30, 2013

(65) Prior Publication Data

US 2015/0189229 A1    Jul. 2, 2015

(51) Int. Cl.
*H04N 7/14* (2006.01)
*H04W 28/02* (2009.01)
*H04W 48/18* (2009.01)

(52) U.S. Cl.
CPC .............. *H04N 7/147* (2013.01); *H04N 7/148* (2013.01); *H04W 28/0268* (2013.01); *H04W 48/18* (2013.01)

(58) Field of Classification Search
CPC ........... H04N 7/14; H04N 7/142; H04N 7/15; H04W 76/025
USPC .............................. 348/14.01–14.12; 370/352
See application file for complete search history.

(56) References Cited

U.S. PATENT DOCUMENTS

| 8,069,465 | B1 | 11/2011 | Bartholomay et al. | |
|---|---|---|---|---|
| 2002/0083462 | A1* | 6/2002 | Arnott | 725/100 |
| 2004/0239754 | A1 | 12/2004 | Shachar et al. | |
| 2008/0309748 | A1* | 12/2008 | Franceschini et al. | 348/14.01 |
| 2009/0172200 | A1 | 7/2009 | Morrison et al. | |
| 2010/0007712 | A1* | 1/2010 | Jang | 348/14.02 |
| 2014/0240446 | A1* | 8/2014 | Hsu et al. | 348/14.09 |

FOREIGN PATENT DOCUMENTS

WO    2009105163 A1    8/2009

OTHER PUBLICATIONS

Rosenberg, J. et al. "Session Traversal Utilites for NAT (STUN)." Network Working Group, RFC 5389, Standards Track, Oct. 2008, pp. 1-48.
Mahy, R. et al. "Traversal Using Relays around NAT (TURN) : Relay Extensions to Session Traversal Utilities for NAT (STUN)." Internet Engineering Task Force (IETF), RFC 5766, Standards Track, Apr. 2010, pp. 1-67.
Website link <http://www.webrtc.org/>, accessed on Dec. 17, 2014, p. 1.
International Standard. "Information technology—Dynamic adaptive streaming over HTTP (DASH)—Part 1: Media presentation description and segment formats." ISO/IEC 23009-1:2012(E), First Edition Apr. 1, 2012, pp. 1-134.
Website link <http://www.skype.com/en/>, accessed on Feb. 6, 2015, pp. 1-7.
Website link <https://io.swisscom.ch/en/introduction>, accessed on Feb. 6, 2015, pp. 1-3.

* cited by examiner

*Primary Examiner* — Melur Ramakrishnaiah
(74) *Attorney, Agent, or Firm* — Coats & Bennett, PLLC

(57) ABSTRACT

A first user device establishes a video telephony session with a second user device over a best effort network. The voice quality for the video telephony session is upgraded by establishing a voice call with the second user device over a telephony network providing a quality of service guarantee for the voice call, and coupling the voice call over the telephony network with the video telephony session.

30 Claims, 8 Drawing Sheets

INTERNET PROTOCOL VIDEO TELEPHONY WITH CARRIER GRADE VOICE

TECHNICAL FIELD

The present disclosure relates generally to video telephony over Internet Protocol (IP) networks and, more particularly, the voice quality enhancements for IP video telephony sessions.

BACKGROUND

Recently, Internet-based solutions for multimedia communication have evolved and a large number of techniques have been proposed to enable acceptable quality video telephony over a best effort network, such as the Internet. As a result, a large number of Internet applications providing video-telephony services have emerged. Two well-known examples are Skype and Apple Computer's Facetime. Google and Facebook are also planning to provide video telephony services between their subscribers.

Advances in broadband mobile communication technology have also reached a point where mobile subscribers use their user devices, such as smartphones, tablets, and laptop computers, to access the Internet and perform tasks that recently required a computer with a fixed connection to the Internet. Due to the ubiquitous nature of mobile communications and the advances in broadband mobile communication technology, it is expected that large numbers of mobile subscribers will use user devices, such as smartphones, tablets, and laptop computers, for video telephony services.

The Internet is a best effort network and does not provide strict Quality of Experience (QoE) guarantees for an ongoing video telephony session. This problem is more pronounced for users that access the Internet with user devices because of the potential change in the available rates due to factors such as the distance from the antenna, fading and network load. Another problem with video telephony over mobile access networks relates to handover between networks using different radio access technologies (RATs), which may provide different data rates and different levels of service.

The Third Generation Partnership Project (3GPP) has developed a Quality of Service (QoS) architecture that makes it possible to initiate and setup QoS-bearers. These QoS bearers can provide guaranteed latency, bandwidth, and/or data rates to mobile subscribers. While this mobile QoS architecture supports video telephony services over current mobile broadband networks, it is unlikely that current Internet video telephony applications will use this architecture. The main reason is that the capacity demand of a high-grade video service is high and that, due to radio resource limitations, providing video telephony service over a mobile access network would be very expensive for the service provider and/or mobile subscriber. The radio resource limitations will become more problematic with the appearance of high-resolution user devices and demand for high resolution video streams during video telephony sessions.

Therefore, a solution is needed for providing high quality video telephony services over mobile access networks.

SUMMARY

Exemplary embodiments of the disclosure comprise methods implemented by a user device for upgrading voice quality of a video telephony session. In one embodiment, the method comprises establishing a video telephony session with a second user device over a best effort network; and upgrading voice quality for the video telephony session. The voice quality is upgraded by establishing a voice call with the second user device over a telephony network providing a quality of service guarantee for the voice call; and coupling the voice call over the telephony network with the video telephony session.

Other embodiments of the disclosure comprise a user device capable of providing video telephony services. In one embodiment, the user device comprises a first transceiver circuit for communicating over a best effort network, a second transceiver circuit for communicating over a telephony network, and a processing circuit operatively connected to the first and second transceiver circuits. The processing circuit is configured to establish a video telephony session with a second user device via the first over the best effort network. The processing circuit is further configured to upgrade the voice quality of the video telephony session by establishing a voice call with the second user device over a telephony network providing a quality of service guarantee for the voice call, and coupling the voice call over the telephony network with the video telephony session.

Other embodiments of the disclosure comprise methods implemented by a network node in a best effort network for upgrading a video telephony session between a first user device and a second user device. In one embodiment, the method comprises establishing a video telephony session between the first and second user devices over the best effort network; sending to at least one of the first and second user devices an indication that a voice upgrade is available; receiving an upgrade request from at least one of the first and second user devices; and coordinating with at least one of the first and second user devices to establish a voice call between the first and second user devices over a telephony network providing a quality of service guarantee for the voice call.

Still other embodiments of the disclosure comprise a network node in a best effort network providing video telephony services. One embodiment of the network node comprises a network interface for communicating with user device over the best effort network, and a processing circuit operatively connected to the best effort network. The processing circuit is configured to establish a video telephony session between the first and second user devices over the best effort network; send to at least one of the first and second user devices an indication that a voice upgrade is available; receive an upgrade request from at least one of the first and second user devices; and coordinate with at least one of the first and second user devices to establish a voice call between the first and second user devices over a telephony network providing a quality of service guarantee for the voice call.

The present disclosure enables a carrier-grade (CG) voice experience during an IP video telephony session. This upgrade voice experience is beneficial because the voice experience has the most substantial contribution to the overall perception of quality by a user.

DETAILED DESCRIPTION

Figure 1:
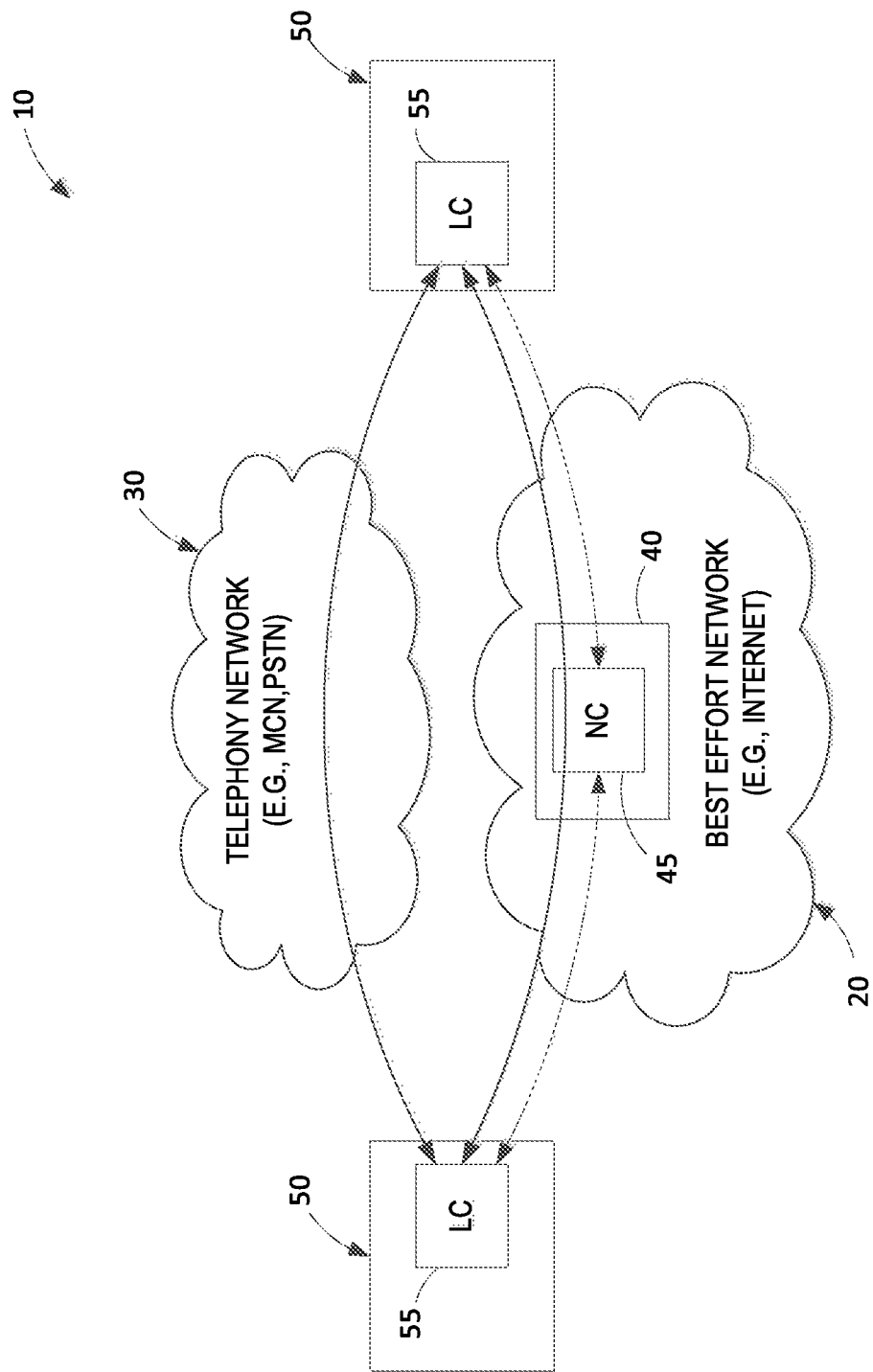
FIG. 1 illustrates a communication network providing carrier grade voice for an IP video telephony session.

Referring now to the drawings, FIG. 1 illustrates a communication network 10 providing video telephony service with carrier grade voice to user devices 50. The user devices 50 may comprise any type of device with video telephony capabilities such as desktop computers, laptop computers, smartphones, and tablets. The communication network 10 comprises a best effort network 20 providing best effort services and a telephony network 30 providing a carrier grade voice services. The term carrier grade voice services as used herein means a voice service that provides a guaranteed quality of service, i.e. guaranteed latency, bandwidth, data rate, etc. The best effort network 20 may comprise, for example, the Internet or other wide area network (WAN) using the Internet Protocol (IP). The telephony network 30 may, for example, comprise a mobile communication network (MCN) or the public switched telephone network (PSTN). The mobile communication network may operate according to any standards now known or later developed including the Global System for Mobile Communications (GSM), General Packet Radio Service (GPRS), Evolved General Packet Radio Service (E-GPRS), Enhanced Data Rates for GSM Evolution (EDGE), Wideband Code Division Multiple Access (WCDMA). Worldwide Interoperability for Microwave Access (WiMAX) and Long Term Evolution (LTE).

The functional entities involved in the video telephony services comprise a network controller 45 disposed in a network node 40 the best effort network 20 and local controllers 55 disposed in the user devices 50. The network controller 45 and local controllers 55 may be implemented by software executing on a network node 40 or user device 50 respectively. The network controller 45 establishes a video telephony session between two user devices 50. As will be explained in greater detail below, the network controller 45 may also coordinate with the local controllers 55 in the user devices 50 to establish a voice call between the user devices 50 over the telephony network 30 for upgraded voice services. The voice and video streams are represented as solid lines. Control information exchanged between the network controller 45 and the local controllers 55 is represented as dotted lines.

In one embodiment, the network controller 45 determines whether the user devices 50 are reachable over the telephony network 30 when the video telephony session is established. If both user devices 50 are reachable over the telephony network 30, the network controller 45 may indicate to one or more of the user devices 50 that upgraded voice services for the video telephony session are available. Information about the reachability of the user devices 50 may be obtained from the user devices 50, or from information servers in either the best effort network 20 or telephony network 30. If one of the user devices 50 requests an upgrade of the voice service, the network controller 45 may coordinate with the local controllers 55 to establish a voice call between the user devices 50 over the telephony network 30.

In some embodiments, one or both user devices 50 may determine that the other is reachable over the telephony network 30. In this case, the local controller 55 in one or both of the user devices 50 may signal the network controller 45 to indicate that a voice connection for the video telephony session will be established over the telephony network 30. In this case, the network controller 45 can drop the voice stream for the video telephony session.

Regardless of how the voice call is established over the telephony network 30, the local controller 55 at each user 50 will couple the video stream over the best effort network 20 with the voice stream over the telephony network 30 to provide a seamless transfer of the voice connection from the best effort network 20 to the telephony network 30.

Figure 2:
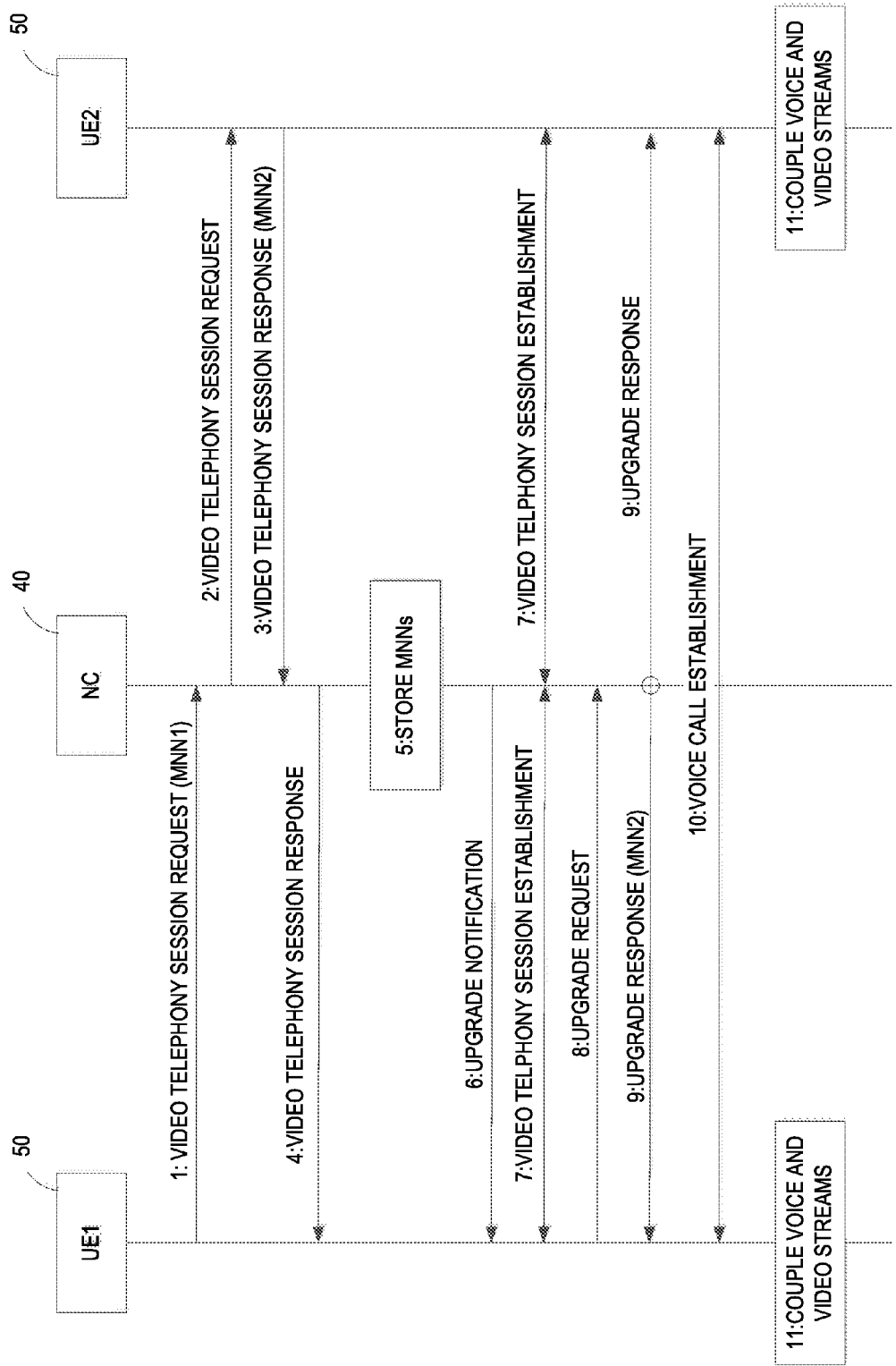
FIG. 2 illustrates signaling for establishing a carrier grade voice connection according to a first embodiment.

FIG. 2 illustrates exemplary signaling between a network node 40 in a best effort network and two user devices for establishing a video telephony session with carrier grade voice. For purposes of this example, it is assumed that the video telephony session is established over the Internet and that a voice call is established over a QOS bearer in a mobile communication network, such as a WCDMA network or LTE network. The QOS bearer provides a guaranteed quality of service for the voice call.

The first user device, denoted UE-1, sends a video telephony session request to the network controller 45 (step 1). The video telephony session request includes the mobile network number (MNN1) of UE-1. The network controller 45 extracts the mobile network number of the first user device 50 from the video telephony session request and forwards the video telephony session request to the second user device, denoted UE-2 (step 2). The second user device 50 accepts the video telephony session request and sends a video telephony session response to the network controller 45 (step 3). The video telephony session response includes the mobile network number, MNN2, of the second user device 50. The network controller 45 extracts the mobile network number of the second user device 50 and forwards the video telephony session response to the first user device 50 (step 4). The network controller 45 stores the mobile network numbers of the first and second user devices 50 (step 5). Upon determining that the user devices 50 are reachable over the mobile communication network, the network controller 45 sends an upgrade notification to the first user device 50 (step 6). It will be appreciated, however, that the network controller 45 could send the upgrade notification to either one or both of the user devices 50. While waiting for a response from the first user device, the network controller 45 executes a video telephony session establishment procedure with the first and second user devices 50 (step 7). The network controller 45 thereafter receives an upgrade request from the first user device (step 8). In response to the upgrade request, the network controller 45 sends an upgrade response to the first and second user devices 50 (step 9). The upgrade response to each of the first and second user device 50 includes the mobile network number of the other user device 50. The first and second user devices 50 establish a voice call over the mobile communication network 30 (step 10). In one embodiment, the first user devices 50 uses the mobile network number of the second user device 50 to initiate a voice call to the second user device over the mobile communication network 30. Alternatively, the second user device 50 could initiate the voice call. When the voice call is answered by the second user device 50, an upgraded voice connection for the video telephony connection is established. The local controllers 55 in the user devices 50 then couple the voice call over the mobile communication network 30 with the video telephony session over the best effort network 20 (step 11). The user devices 50 can transmit and receive the voice streams over the mobile communication network 30 while receiving the video streams over the best effort network 20.

Figure 3:
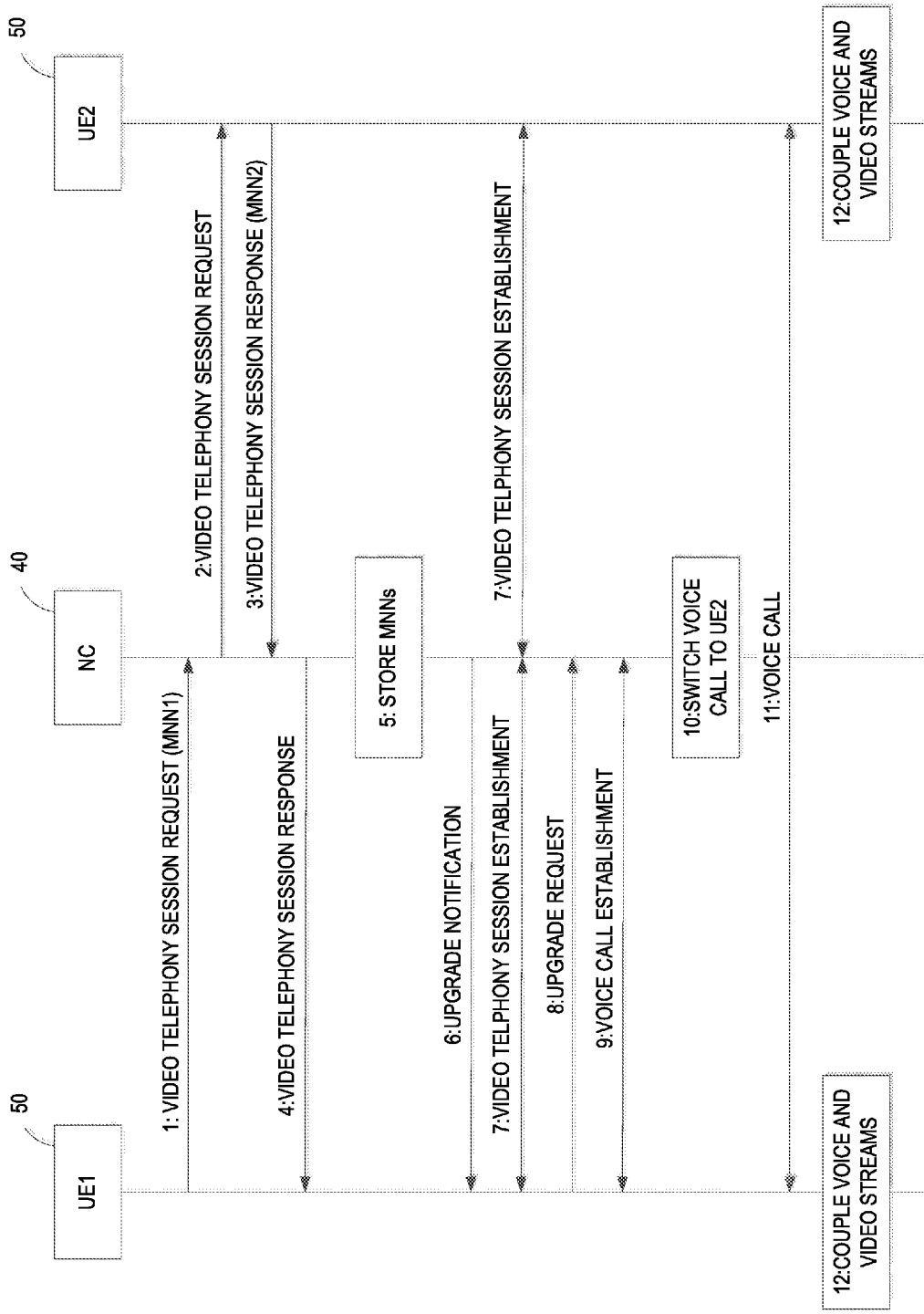
FIG. 3 illustrates signaling for establishing a carrier grade voice connection according to a second embodiment.

FIG. 3 illustrates signaling between the network node 40 in the best effort network and user devices 50 in another embodiment of the disclosure. In this embodiment, the video telephony session is established over the best effort network as previously described. Steps 1 through 7 are the same as in the previous embodiment. After the video telephony session is established (step 7), the first user device 50 sends an upgrade request to the network controller 45 (step 8). In response to the upgrade request, the network controller 45 establishes a voice call with the first user device 50. In one embodiment, the network controller 45 at the network node 40 uses the mobile network number stored in step 5 to initiate a voice call with the first user device 50 over the mobile communication network 30. Upon answering the voice call by the first user device 50, a voice call is established between the first user device 50 and the network controller 45 (step 9). Once the voice call is established, the network controller 45 signals the mobile communication network 30 to switch termination of the voice call at the network controller 45 to the second user device 50 (step 10). Procedures for switching the voice call are described in the 3GGP specifications TS 23.237, sec. 6.3.2.2.2, and TS 23893, sec. 6.55.2.2. After the voice call is switched, an end-to-end connection for the voice call is established between the first and second user devices 50 (step 11). The local controllers 55 in the user devices 50 then couple the voice call over the mobile communication network 30 with the video telephony session over the best effort network 20 (step 12). The user devices 50 transmit and receive the voice streams over the mobile communication network 30 while receiving the video streams over the best effort network 20.

Figure 4:
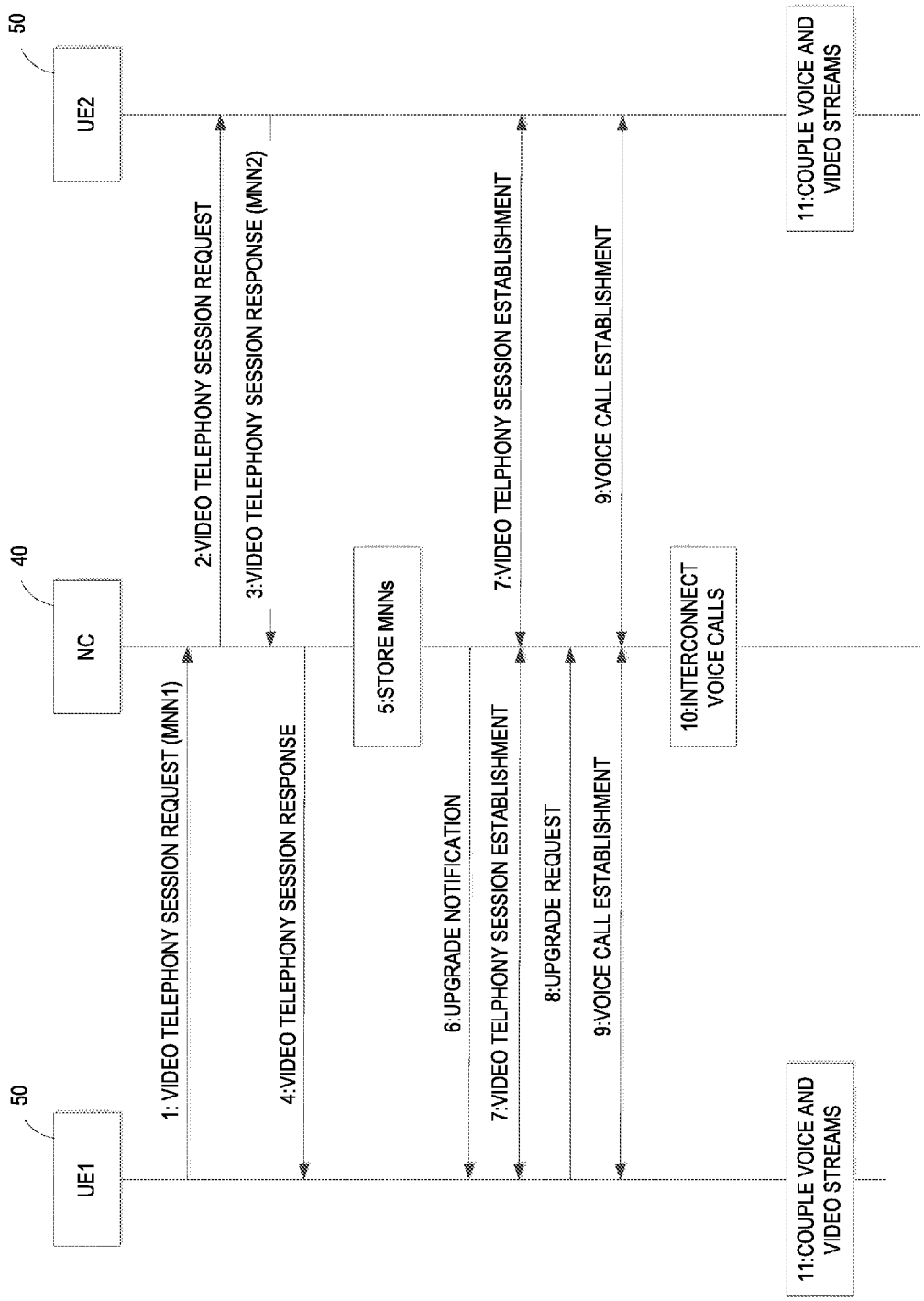
FIG. 4 illustrates signaling for establishing a carrier grade voice connection according to a third embodiment.

FIG. 4 illustrates signaling between a network node 40 and two user devices 50 according to a third embodiment of the disclosure. In this embodiment, this network controller 45 establishes voice connections with each user device 50 and interconnects the voice connections to establish a voice communication path between the first and second user devices 40. The video telephony session is established as previously described. Thus, steps 1 through 7 are the same as the two previous embodiments. After the video telephony session is established, the network controller 45 receives an upgrade request from the first user device 50 (step 8). Upon receipt of the upgrade request, the network controller 45 uses the stored mobile network numbers of the first and second user devices 50 to establish voice calls over the mobile communication network between the network controller 45 and each one of the user devices 50 (step 9). Once the voice calls with both user devices 50 are established, the network controller 45 interconnects the voice calls to establish a voice connection between the first and second user devices 50. In this example, the voice path goes through the network node 40 hosting the network controller 45. After the voice communication path is established, the local controllers 55 at each user device 50 couple the voice call over the network communication network 30 with the video telephony session over the best effort network 20. The user devices 50 and receive the voice streams over the mobile communication network while transmitting and receiving video streams over the best effort network. In this example, synchronization between the voice streams and video streams can be performed at the network controller 45.

Figure 5:
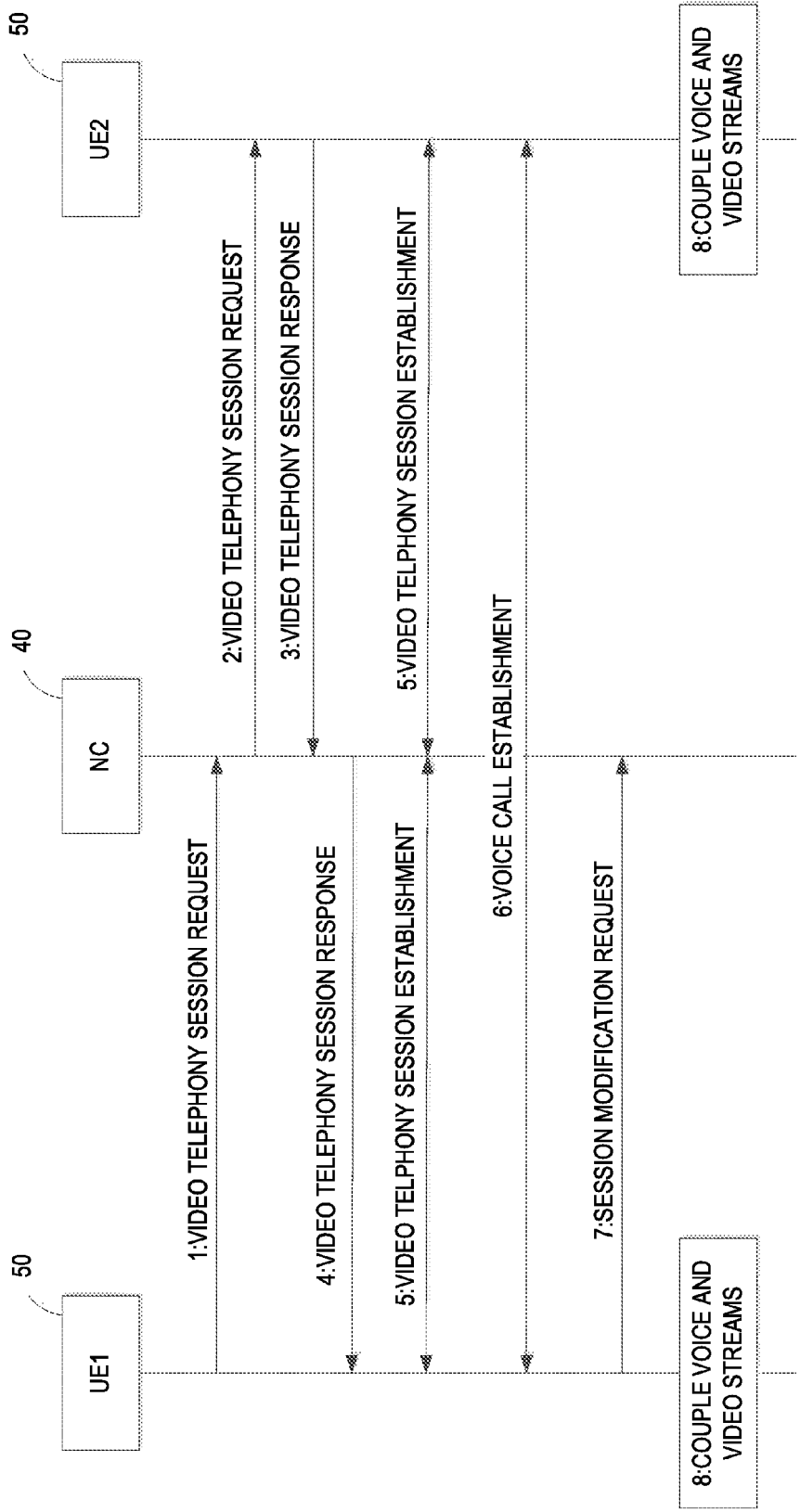
FIG. 5 illustrates signaling for establishing a carrier grade voice connection according to a fourth embodiment.

FIG. 5 illustrates signaling between the network node 40 and two user devices 50 in another embodiment of the disclosure. In this embodiment, the network controller 55 is not involved in the establishment of the voice call between the user devices 50. In this embodiment, the network controller 45 establishes a video telephony session with the first and second user devices 50 as previously described, except that the user devices 50 do not need to provide the mobile network numbers to the network controller 45 (steps 1-5). Once the video telephony session is established (step 5), the user devices 50 establish a voice call over the mobile communication network 30 (step 6). It is assumed that the user devices 50 are aware of each other. Once the voice call is established, one of the user devices 50 (UE-1 in this example) sends a session modification request to the network controller 45 to inform the network controller 45 that voice connection for the video telephony session is established over the mobile communication network 30 (step 7). The network controller 45 can then drop the voice stream for the video telephony session. After the voice call is established, the user devices 50 couple the voice call over the mobile communication network 30 with the video telephony session over the best effort network 20 (step 8). The user devices 50 transmit and receive the voice streams over the mobile communication network 30 while transmitting and receiving video streams over the best effort network 20.

Figure 6:
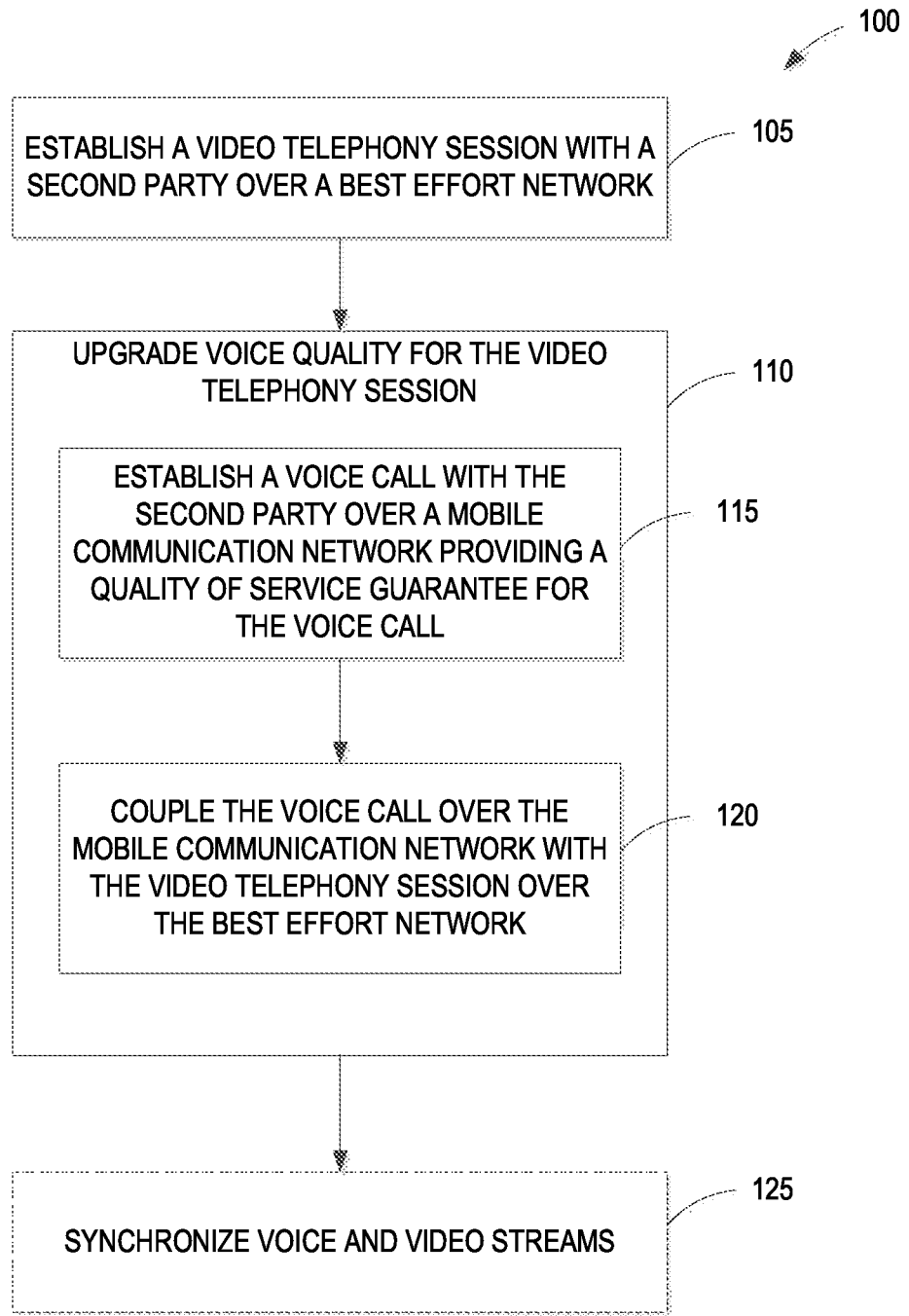
FIG. 6 illustrates a method implemented by a user device for establishing a carrier grade voice connection for a video telephony session.

FIG. 6 illustrates an exemplary method 100 implemented by a user device 50 for establishing a video telephony session. The user device 50 initially establishes a video telephony session with a second user device 50 over a best effort network 20 (block 105). The user device 50 additionally upgrades the voice quality for the video telephony session (block 110). To upgrade the voice quality, the user device 50 establishes a voice call with the second user device 50 over a mobile communication network 30 providing a quality of service guarantee for the voice call (block 115). Once the voice call is established, the user device 50 couples the voice call over the mobile communication network 30 with the video telephony session over the best effort network 20. In some embodiments, the user device 50 may optionally synchronize the voice and video streams received over the two networks (block 125). Alternatively, the local controllers 55 in the user device 50 may send synchronization information to the network controller 45 in the network node 40. The synchronization information may comprise information about the timing of the voice stream. The network node 40 can use the synchronization information to synchronize the video stream with the voice stream at the network node 40.

Figure 7:
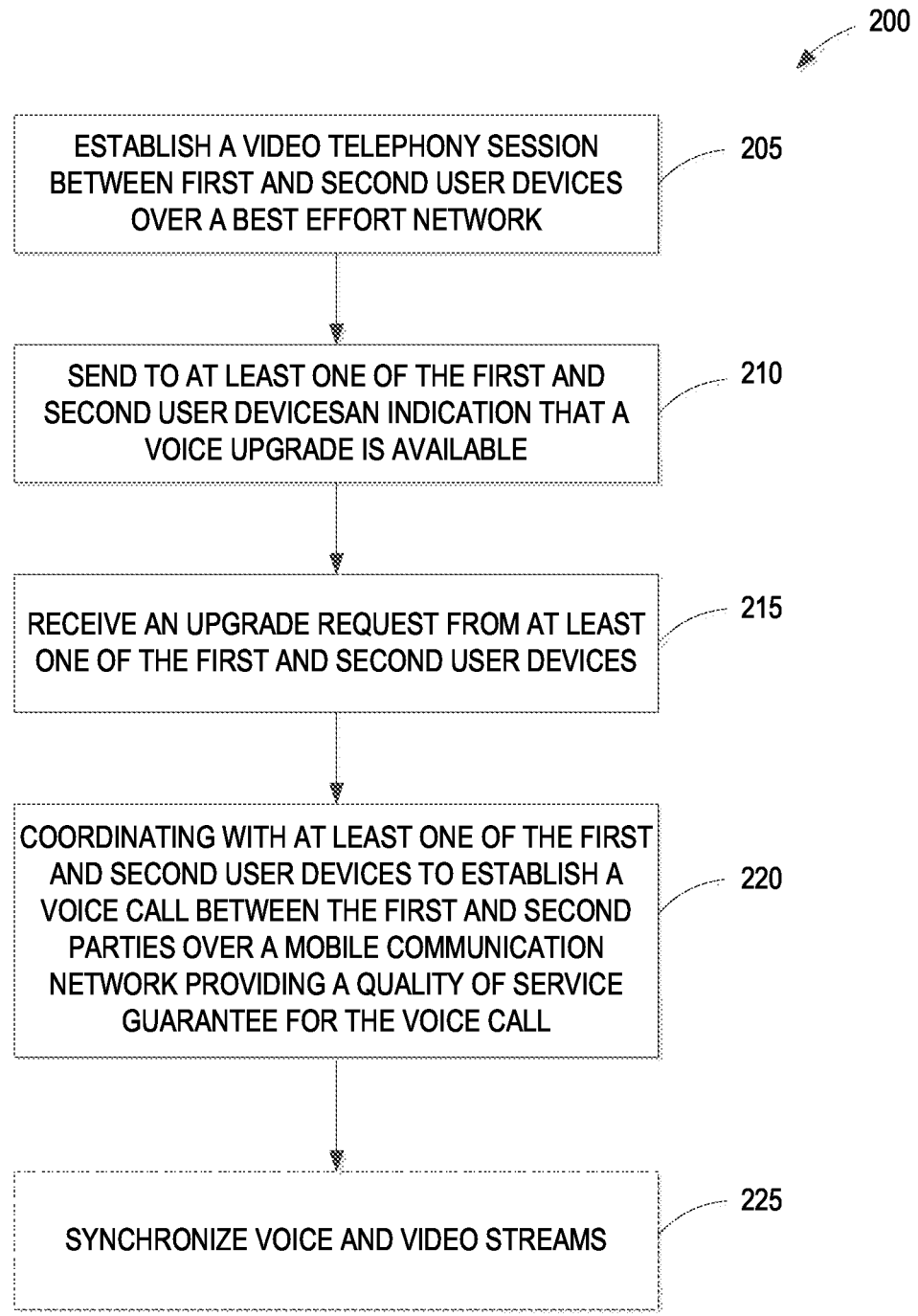
FIG. 7 illustrates a method implemented by a network node in a best effort network for establishing a carrier grade voice connection for a video telephony session.

FIG. 7 illustrates an exemplary method 200 implemented by a network node 40 in a best effort network 20. The method 200 begins with the network node 40 establishing a video telephony session between first and second user devices 50 over a best effort network 20 (block 205). The network node 40 additionally sends an indication that a voice upgrade is available to at least one of the first and second user devices 50 (block 210). In response to the upgrade notification, the network node 40 receives an upgrade request from one or both of the first and second user devices 50 (block 215). In response to the upgrade request, the network node 40 coordinates with one or both of the user devices 50 to establish a voice call between the first and second user devices 50 over the mobile communication network 30 (block 220). The first voice call is established over a QoS bearer providing quality of service guarantee for the voice call. In some embodiments, the network node 40 may also synchronize the voice and video streams. To facilitate synchronization, the network node may receive synchronization information from one or both of the user devices 50.

Figure 8:
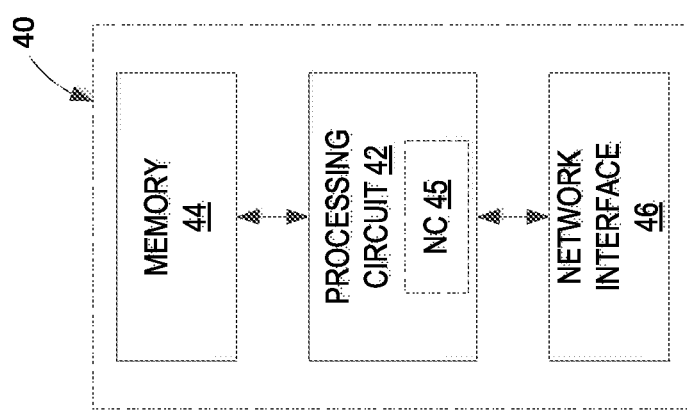
FIG. 8 illustrates a network node in a best effort network configured to provide video telephony services with carrier grade voice.

FIG. 8 illustrates a processing circuit 42, memory 44, and a network interface 46. The processing circuit may comprise one or more processors, hardware, firmware or a combination thereof. The processing circuit 42 is configured by program instructions stored in memory 44. Memory 44 may comprise read only memory (ROM), random access memory (RAM), or flash memory. Memory 44 stores program instruction and data used by the processing circuit 42. Network interface 46 comprises an interface circuit for connecting the network node 40 to the best effort network 20. The network interface circuit may for example, comprise an Ethernet internet interface.

Figure 9:
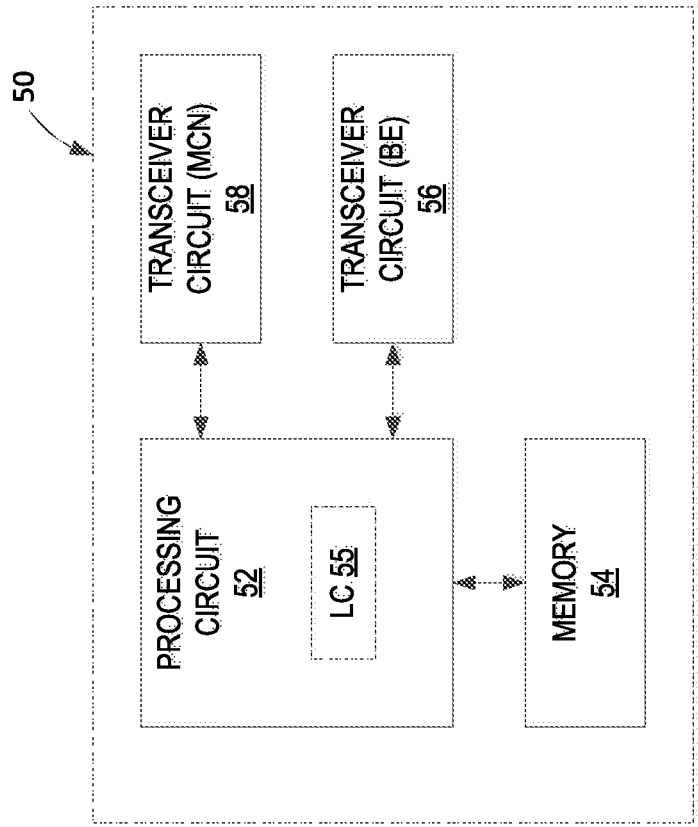
FIG. 9 illustrates a user device configured to provide video telephony services with carrier grade voice.

FIG. 9 illustrates an exemplary user device 50 according to an embodiment of the disclosure. The user device 50 comprises a processing circuit 52, memory 54, a first transceiver circuit 56, and a second transceiver circuit 58. The processing circuit comprises one or more processors, hardware, firmware, or a combination thereof configured to implement the techniques herein described. Program instructions and data used by the processing circuit 52 are stored in memory 54. The memory 54 may comprises read only memory (ROM), random access memory (RAM), or flash memory. The first transceiver circuit 56 may comprise, for example, a wireless fidelity (Wi-Fi) interface that operates according to the 802.11 Family of Standards. The first transceiver circuit enables the user device 50 communicate over wireless local area networks (WLAN). The second transceiver circuit may comprise, for example, a local communication transceiver that operates according to known mobile communication standards, such as the GSM, WCDMA, and LTE standards. In some embodiments, the first and second transceiver circuits 56 and 58 may be implemented by a single transceiver circuit that operates according to both Wi-Fi and local communication standards.

The techniques described herein provide a method for upgrading voice quality of an IP video telephony session.

The present disclosure enables a carrier-grade (CG) voice experience during an IP video telephony session. This upgrade voice experience is beneficial because the voice experience has the most substantial contribution to the overall perception of quality by a user.

What is claimed is:

1. A method implemented by a first user device for upgrading voice quality for a video telephony session, said method comprising:
    establishing a video telephony session with a second user device over a best effort network; and
    receiving an indication from a network controller that a voice upgrade is available;
    responsive to said indication, upgrading a voice quality for the video telephony session after the video telephony session is established by:
        sending an upgrade request to the network controller;
        establishing a voice call with the second user device over a telephony network providing a quality of service guarantee for the voice call; and
        coupling the voice call over the telephony network with the video telephony session over the best effort network.

2. The method of claim 1 wherein establishing a video telephony session over a best effort network comprises sending a video telephony session request to a network node in the best effort network, said video telephony request including a network number for reaching the first user device over the telephony network.

3. The method of claim 1 wherein establishing the voice call with the second user device comprises:
    transmitting an upgrade request to the network node;
    receiving, from the network node responsive to the upgrade request, a network number of the second user device for reaching the second user device over the telephony network; and
    initiating a voice call to the second user device over the telephony network using the network number provided by the network node.

4. The method of claim 1 wherein establishing the voice call with the second user device comprises:
    transmitting an upgrade request to the network node; and
    receiving, responsive to the upgrade request, a voice call over the telephony network from the second user device.

5. The method of claim 1 wherein establishing the voice call with the second user device comprises:
    transmitting an upgrade request to the network node;
    receiving, responsive to the upgrade request, a voice call over the telephony network from the network node, wherein the voice call is switched or interconnected to the second user device by the network node.

6. The method of claim 1 wherein establishing the voice call with the second user device over the telephony network comprises initiating a voice call to the second user device over the telephony network.

7. The method of claim 1 wherein establishing a voice call with the second user device over the telephony network comprises receiving a voice call from the second user device over the telephony network.

8. The method of claim 1 wherein establishing a voice call with the second user device over a telephony network comprises receiving a voice call over the telephony network from a network node in the best effort network, wherein the voice call is switched or interconnected to the second user device by the network node.

9. The method of claim 1 further comprising synchronizing a voice stream associated with the voice call with a video stream for the video telephony session.

10. A user device configured for video telephony, said user device comprising:
    a first transceiver circuit for communicating over a best effort network;
    a second transceiver circuit for communicating over a telephony network;
    a processing circuit operatively connected to the first and second transceiver circuits, said processing circuit configured to:
        establish a video telephony session with a second user device over the best effort network;
        receive an indication from a network controller that a voice upgrade is available upgrade, responsive to said indication, the voice quality of the video telephony session after the video telephony session is established by establishing a voice call with the second device over a telephony network providing a quality of service guarantee for the voice call, and coupling the voice call over the telephony network with the video telephony session.

11. The user device of claim 10 wherein, to establish a video telephony session over a best effort network, the processing circuit is configured to send a video telephony session request to a network node in the best effort network, said video telephony request including a network number for reaching the first user device over the telephony network.

12. The user device of claim 10 wherein, to establish the voice with the second user device, the processing circuit is configured to:
- transmit an upgrade request to the network node;
- receive, from the network node responsive to the upgrade request, a network number of the second user device for reaching the second user device over the telephony network; and
- initiate a voice call to the second user device over the telephony network using the network number provided by the network node.

13. The user device of claim 10 wherein, to establish the voice with the second user device, the processing circuit is configured to:
- transmit an upgrade request to the network node; and
- receive, responsive to the upgrade request, a voice call over the telephony network from the second user device.

14. The user device of claim 10 wherein, to establish the voice call with the second user device, the user device is configured to:
- transmit an upgrade request to the network node; and
- receive, responsive to the upgrade request, a voice call over the telephony network from the network node, wherein the voice call is switched or interconnected to the second user device by the network node.

15. The user device of claim 10 wherein, to establish a voice call with the second user device over a telephony network, the processing circuit is configured to initiate a voice over call to the second user device over the telephony network.

16. The user device of claim 10 wherein, to establish a voice call with the second user device over the telephony network, the processing circuit is configured to receive a voice call from the second user device over the telephony network.

17. The user device of claim 10 wherein establishing a voice call with the second user device over a telephony network comprises receiving a voice call over the telephony network from a network node in the best effort network, wherein voice call is switched or interconnected to the second user device by the network node.

18. The user device of claim 10 further comprising synchronizing a voice stream associated with the voice call with a video stream for the video telephony session.

19. A method implemented by a network node in a best effort network for upgrading a video telephony session between a first user device and a second user device, said method comprising:
- establishing a video telephony session between the first and second user devices over the best effort network;
- sending to at least one of the first and second user devices an indication that a voice upgrade for the video telephony session is available;
- receiving an upgrade request from at least one of the first and second user devices after the video telephony session is established; and
- responsive to the upgrade request, coordinating with at least one of the first and second user devices to establish a voice call between the first and second user devices over a telephony network providing a quality of service guarantee for the voice call.

20. The method of claim 19 wherein establishing a video telephony session between the first and second user devices over the best effort network comprises:
- receiving a video telephony session request from the first user device, said video telephony session request including a network number for the first user device;
- forwarding the video telephony request to the second user device;
- receiving a video telephony session response from the second user device, the video telephony session response including a network number of the second user device; and
- forwarding the video telephony session response to the first user device.

21. The method of claim 20 wherein coordinating with at least one of the first and second user devices to establish a voice call between the first and second user devices over a telephony network comprises sending, to at least one of the first and second user devices responsive to the upgrade request, an upgrade response including the network number of the other one of the first and second user devices to enable the first and second user devices to establish a voice call over the telephony network.

22. The method of claim 20 wherein coordinating with at least one of the first and second user devices to establish a voice call between the first and second user devices over a telephony network comprises:
- establishing a voice call over the telephony network between the network node and one of the first and second user devices; and
- switching the voice call from the network node to the other one of the first and second user devices.

23. The method of claim 20 wherein coordinating with at least one of the first and second user devices to establish a voice call between the first and second user devices over a telephony network comprises:
- establishing a first voice call over the telephony network between the network node and the first user device;
- establishing a second voice call over the telephony network between the network node and the second user device; and
- interconnecting the first and second voice calls.

24. The method of claim 19 further comprising synchronizing a voice stream associated with the voice call with a video stream for the video telephony session.

25. A network node in a best effort network, said network node comprising:
- a network interface for communicating with user device over the best effort network;
- a processing circuit operatively connected to the best effort network, the processing circuit configured to:
  - establish a video telephony session between the first and second user devices over the best effort network;
  - send to at least one of the first and second user devices an indication that a voice upgrade is available for the video telephony session;
  - receive an upgrade request from at least one of the first and second user devices after the video telephony session is established; and
  - responsive to the upgrade request, coordinate with at least one of the first and second user devices to establish a voice call between the first and second user devices over a telephony network providing a quality of service guarantee for the voice call.

26. The network node of claim 25 wherein, to establish a video telephony session between the first and second user devices over the best effort network, the processing circuit is configured to:
- receive a video telephony session request from a the first user device, said video telephony session request including a network number for the first user device;

forward the video telephony request to the second user device;

receive a video telephony session response from the second user device, the video telephony session response including a network number of the second user device; and forward the video telephony session response to the first user device.

27. The network node of claim 26 wherein, to coordinate with at least one of the first and second user devices to establish a voice call between the first and second user devices over a telephony network, the processing circuit is configured to:

send, to at least one of the first and second user devices responsive to the upgrade request, an upgrade response including the network number of the other one of the first and second to enable the first and second user devices to establish a voice call over the telephony network.

28. The network node of claim 26 wherein, to coordinate with at least one of the first and second user devices to establish a voice call between the first and second user devices over a telephony network, the processing circuit is configured to:

establish a voice call over the telephony network between the network node and one of the first and second user devices; and switch the voice call from the network node to the other one of the first and second user devices.

29. The network node of claim 26 wherein, to coordinate with at least one of the first and second user devices to establish a voice call between the first and second user devices over a telephony network, the processing circuit is configured to:

establish a first voice call over the telephony network between the network node and the first user device;

establish a second voice call over the telephony network between the network node and the second user device; and interconnect the first and second voice calls.

30. The network node of claim 25 wherein the processing circuit is further configured to synchronize a voice stream associated with the voice call with a video stream associated for the video telephony session.

* * * * *

UNITED STATES PATENT AND TRADEMARK OFFICE
CERTIFICATE OF CORRECTION

PATENT NO. : 9,204,092 B2  
APPLICATION NO. : 14/143480  
DATED : December 1, 2015  
INVENTOR(S) : Cserna et al.

It is certified that error appears in the above-identified patent and that said Letters Patent is hereby corrected as shown below:

In the specification,

In Column 5, Line 42, delete "devices 40." and insert -- devices 50. --, therefor.

Signed and Sealed this
Twenty-second Day of March, 2016

Michelle K. Lee
*Director of the United States Patent and Trademark Office*